United States Patent [19]
Blackwell, Jr.

[11] Patent Number: 4,476,265
[45] Date of Patent: Oct. 9, 1984

[54] PIGMENTED COMPOSITIONS
[75] Inventor: Jennings P. Blackwell, Jr., Bartlesville, Okla.
[73] Assignee: Phillips Petroleum Company, Bartlesville, Okla.
[21] Appl. No.: 526,253
[22] Filed: Aug. 25, 1983
[51] Int. Cl.$^3$ .................... C08K 3/04; C08K 3/28; C08K 3/40; C08L 81/04
[52] U.S. Cl. .................... 524/10; 524/15; 524/59; 524/63; 524/425; 524/609
[58] Field of Search ............... 524/15, 10, 63, 59, 524/609, 425

[56] References Cited
U.S. PATENT DOCUMENTS

| | | | |
|---|---|---|---|
| 3,354,129 | 11/1967 | Edmonds, Jr. et al. | 260/79 |
| 3,521,214 | 7/1970 | Bennett et al. | 338/322 |
| 3,856,736 | 12/1974 | Tieszen et al. | 260/29.6 F |
| 4,080,735 | 3/1978 | Michalski | 524/609 |
| 4,115,283 | 9/1978 | Needham | 252/12.4 |
| 4,173,681 | 11/1979 | Durrieu et al. | 428/409 |

FOREIGN PATENT DOCUMENTS

| | | | |
|---|---|---|---|
| 57-23655 | 2/1982 | Japan | 524/609 |
| 1586340 | 3/1981 | United Kingdom | 524/609 |

OTHER PUBLICATIONS

*Plastics Compounding*, Mar./Apr. 1982, pp. 22-24, 26, 28, 30 and 32.
*Elastomerics*, Aug. 1981, pp. 49-52.

*Primary Examiner*—Allan M. Lieberman
*Attorney, Agent, or Firm*—Howard D. Doescher

[57] ABSTRACT

Poly(arylene sulfide) compositions are pigmented with black carbonaceous pigments selected from at least one of finely divided bituminous coal, carbonized rice hulls, bone blacks, and micropulverized petroleum coke in an amount sufficient to provide the black pigmentation desired with little or no deleterious effect on the mechanical properties such as flexural and tensile strengths of the resin.

23 Claims, No Drawings

PIGMENTED COMPOSITIONS

This invention relates to pigmented arylene sulfide polymers and to the preparation thereof. In accordance with another aspect, this invention relates to arylene sulfide polymer compositions pigmented with black carbonaceous pigments that do not adversely affect the mechanical properties of the polymer. In accordance with the further aspect, this invention relates to the use of selected black carbonaceous pigments that will provide the desired black pigmentation without adversely affecting the mechanical properties of the polymer compositions. In accordance with still another aspect, this invention relates to poly(arylene sulfide) resins pigmented with selected black carbonaceous pigments in amounts such that the desired black pigmentation is provided and mechanical properties, such as tensile and flexural strengths, are not significantly altered due to the presence of the black carbonaceous pigments.

BACKGROUND

Poly(arylene sulfide), e.g. poly(phenylene sulfide) (PPS), compositions comprising fillers, reinforcing agents, pigments, processing aids, stabilizers, etc. are known in the art to provide coatings or articles by various molding techniques which have outstanding heat and chemical resistance.

For various reasons it is often desired that a black pigmented PPS article be produced. Carbon black is a well known black pigmenting material which has found widespread use with a variety of polymers including PPS. It is noted here that electrically conductive PPS compositions having 4–50, preferably 4–10% by weight of finely divided carbon black are disclosed in U.S. Pat. No. 3,521,214. For this application a furnace black is specifically preferred. Other patents such as U.S. Pat. Nos. 3,354,129 and 4,115,283 suggest carbon black as a filler with the latter proposing a filler level of 10–20 weight %.

Although furnace black is relatively inexpensive and only low levels, e.g. 1-2 wt. %, are used as pigments in PPS compositions it has been found that the physical (mechanical) properties of the PPS compounds comprising said furnace carbon blacks are significantly lowered compared to compounds containing no pigment. Specifically, tensile strength and flexural strength properties appear to be especially sensitive to the presence of furnace carbon black at pigmenting levels. It is therefore desirable that an inexpensive black pigment be found for use in PPS compounds which does not cause the significant decrease in mechanical properties shown by furnace carbon blacks.

Accordingly, an object of this invention is to provide arylene sulfide polymer compositions containing black carbonaceous pigments.

Another object of this invention is to provide black pigments for arylene sulfide polymers which do not adversely affect the mechanical properties of the polymer.

It is a further object of this invention to provide a method for incorporating black carbonaceous pigments into arylene sulfide polymer compositions.

Other objects, aspects, as well as the several advantages of the invention, will be apparent to those skilled in the art upon reading the specification and the appended claims.

SUMMARY OF THE INVENTION

In accordance with the invention, it has now been discovered that black carbonaceous pigments selected from the group consisting of finely divided bituminous coal, carbonized rice hulls, certain bone blacks and micropulverized petroleum coke can be utilized in arylene sulfide polymer compositions with little or no deleterious effect on the mechanical properties of the polymers.

In accordance with a specific embodiment of the invention, a process is provided for the black pigmentation of poly(arylene sulfide) resins, such as poly(phenylene sulfide), which comprises incorporating carbon from a source selected from the group consisting of bituminous coal, rice hulls, bones, and petroleum coke under conditions to obtain a pigmented polymeric product exhibiting less decrease in physical properties, such as flexural and tensile strengths, in comparison with polymers pigmented with other blacks.

SCOPE OF POLY(ARYLENE SULFIDE)

The poly(arylene sulfide) polymers useful in this invention are those conventionally employed in applications utilizing black pigmenting operations. As such, a wide range of poly(arylene sulfide) polymers are useful. Such polymers are prepared by methods known in the art as exemplified by U.S. Pat. Nos. 3,354,129; 3,919,177 and 4,038,261. Poly(arylene sulfide) polymers which are generally useful in this invention can be described as having a flow rate of between about 10 and about 1,000 g/10 min. as determined by ASTM D 1238-79, Procedure B modified to use 5 kg weight, 316° C. and 0.17 mm die orifice.

The instant invention is particularly useful for poly(arylene sulfide) compositions which contain inorganic fillers and/or fibrous reinforcing agents. Examples of suitable inorganic fillers include calcium carbonate, titanium dioxide, barium sulfate, diatomaceous earth, hydrated aluminum silicates, talc or combinations thereof. Examples of suitable fibrous reinforcing agents include glass fibers, boron fibers, ceramic fibers, carbon fibers, or combinations thereof. Glass fibers are presently preferred because of cost and ease of handling considerations. The amount of inorganic filler and/or fibrous reinforcing agent which can be present in the poly(arylene sulfide) compositions can vary over a wide range but will usually be in the range of about 10 to about 70% by wt. based on the total composition weight. Additional ingredients such as mold release agents, mold corrosion inhibitors, and flow improvers can also be present in small amounts such as from about 0.1 to about 2% by wt. based on the total composition weight. The use of these additives in poly(arylene sulfide) compositions is known in the art.

SCOPE OF BLACK PIGMENT

As noted in Section I above it has been found that black carbonaceous pigments selected from the group consisting of finely divided bituminous coal, carbonized rice hulls, certain bone blacks, i.e. Cosmic Black D-2, and micropulverized petroleum coke can be utilized in PPS compounds with little or no deleterious effect on the mechanical properties of the PPS compounds. These carbonaceous black pigments can have an average particle size from about 0.001 to about 50 microns, preferably from about 0.002 to about 15 microns.

The amount of black carbonaceous pigment incorporated into the arylene sulfide polymers will vary somewhat depending upon the degree of pigmentation desired plus an amount which does not adversely affect the physical properties, such as tensile and flexural strengths, of the polymer being pigmented. The minimum amount of black carbonaceous pigment incorporated into the polymer is preferably at least about 0.25 weight percent based on the weight of the total composition. In general, the carbonaceous materials of the invention are employed within the broad range of about 0.25 to about 4, preferably 0.5 to 2.5% by wt. based on the weight of the total composition.

An example of a suitable finely divided bituminous coal is Austin Black 325 available from Slab Fork Coal Co. Slab Fork, West Virginia. This material has a specific gravity of 1.22, an average particle size of 2.65 m$\mu$ (millimicrons), and an average surface area of 12 m$^2$/g.

An example of a suitable carbonized rice hull pigment is Opal Black which has been supplied by Micro Chemical Industries Detroit, Mich. This material is 87% silica and 13% carbon. It has a specific gravity of 2.15, a particle size of 1.2$\mu$ (microns) and a surface area of 70 m$^2$/g.

An example of a suitable bone black carbonaceous pigment is Cosmic Black D-2 provided by Ebonex Corp. of Melvindale, Mich. This material has a specific gravity of 2.52, a fineness of 0.5 to 10 microns and a carbon content of 9.6% by weight. From experimental results shown later herein it appears that suitable bone blacks should have a carbon content of not more than about 15% by weight.

An example of a suitable finely divided petroleum coke is Micronized Delayed Coke (MDC) from Koch Industries Wichita, Kans. This material has a specific gravity of 1.40, a surface area (N$_2$) of 17-25 m$^2$/g, a particle size range of 0.2-10 microns and an ash content of 0.5 wt. % maximum.

The black carbonaceous pigments utilized in this invention can be mixed with the poly(arylene sulfide) polymer according to known methods. For example, the composition ingredients can be first subjected to a dry blending step in a drum tumbler device then the mix subjected to heat and shear in a mixing extruder. It is often convenient and desirable to separately add the fibrous reinforcing material such as glass fibers to the mix of other ingredients in order to maintain the desired fiber length in the compound. Visual inspection of the mixed compounds is generally all that is needed to check on the adequacy of the mixing conditions. If coloration is uneven or "streaky" then mixing has been inadequate.

The poly(arylene sulfide) compositions comprising the carbonaceous black pigments of this invention are useful for making black fibers and especially useful in making molded articles such as machine parts, e.g. pump impellers and housings, electrical appliance parts, and electronic components.

EXAMPLES

EXAMPLE 1 (Controls)

This example illustrates the problem addressed by the instant invention by showing the results obtained in a series of runs employing oil furnace carbon blacks in a poly(phenylene sulfide) composition. The base PPS composition contained 40% by wt. glass fiber and 60% by wt. PPS having a flow rate of 120±20. To this base composition was added 2 parts by weight of carbon black per 100 parts by weight of the base composition. The compounds were prepared by dry blending the ingredients then extruding the mix through a Davis-Standard 1½ inch extruder using a mixing screw (100 rpm) at 600° F. barrel temperature. The coarsely chopped extrudate was dried 2 hr @ 150° C. then test specimens molded on a New Britain Model 75-OHP. Tensile specimens were of Type I (ASTM D 638): 3 mm thick, 215 mm overall length, 19 mm overall width and 13 mm width at narrow section. Mechanical properties obtained are shown in Table I below.

TABLE I

| Run No. | Carbon Black | Form | Flexural Strength, × 10$^3$ psi | Change Percent | Tensile Strength, × 10$^3$ psi | Change Percent | Compd. Flow Rate, g/10 min |
|---|---|---|---|---|---|---|---|
| 1 | None | — | 29.8 | | 17.5 | | 56 |
| 2 | N-110 | Pellet | 21.2 | (−29%)[a] | 14.1 | (−20%)[a] | 44 |
| 3 | N-550 | Pellet | 19.0 | (−36%) | 13.9 | (−21%) | 55 |
| 4 | N-774 | Pellet | 19.2 | (−36%) | 13.9 | (−21%) | 68 |
| 5 | N-991 | Pellet | 22.5 | (−25%) | 15.0 | (−14%) | 60 |
| 6 | S-315 | Pellet | 18.8 | (−37%) | 13.5 | (−23%) | 84 |
| 7 | Monarch 1300 | Fluff | 27.6 | (−7%) | 18.6 | (−8%) | 29 |
| 8 | Black Pearls 1300 | Pellet | 26.7 | (−10%) | 17.8 | (−11%) | 28 |
| 9 | Monarch 1100 | Fluff | 23.7 | (−21%) | 15.9 | (−9%) | 55 |
| 10 | Monarch 900 | Fluff | 23.1 | (−23%) | 15.8 | (−10%) | 55 |
| 11 | Monarch 880 | Fluff | 24.0 | (−20%) | 15.8 | (−10%) | 68 |
| 12 | Monarch 700 | Fluff | 23.8 | (−20%) | 15.3 | (−13%) | 74 |
| 13 | Regal 330R | Fluff | 20.5 | (−31%) | 13.8 | (−21%) | 91 |
| 14 | Mogul L | Fluff | 23.1 | (−22%) | 15.9 | (−21%) | 36 |

TABLE I-continued

| Run No. | Carbon Black | Form | Flexural Strength, $\times 10^3$ psi | Change Percent | Tensile Strength, $\times 10^3$ psi | Change Percent | Compd. Flow Rate, g/10 min |
|---|---|---|---|---|---|---|---|
| 15 | Pearl L | Pellet | 23.1 | (−22%) | 16.4 | (−18%) | 31 |

[a]Percentages shown are based on values compared to a control run (no black) made at the same time. Since all runs in the Table were not made at the same time some variation in percentages is evident. Values shown for Run No. 1 are considered typical of the control runs.

The carbon blacks in Runs 2–6 are typical rubber grade oil furnace blacks from Phillips Petroleum Company while the blacks in Runs 7–15 are pigment grade oil furnace blacks from Cabot Corp. which are much more expensive than the rubber grade blacks. The results show that all types of the rubber grade blacks caused a decrease of 15–35% in flexural and tensile strength of the PPS compound. The pigment grade blacks gave somewhat better results but still showed about 10–30% loss in these properties. The results also indicate that the form of the carbon black (pellet or fluff) had little effect on the compound properties. The variations seen in the compound flow rate are not large enough to have any significant effect on the processability of the compounds. Values obtained for flexural modulus and Izod impact strength (notched and unnotched) which are not shown indicated only slight variations caused by carbon black addition to the PPS base composition.

Other control runs were made in the same manner and the same amounts as those shown in Table I but employing channel carbon blacks, i.e. blacks obtained from a natural gas pyrolysis process, in contrast to the oil furnace blocks in Table I. The results obtained in these runs are shown in Table II.

TABLE II

| Run No. | Carbon Black | Form | Flexural Strength, $\times 10^3$ psi | Change Percent | Tensile Strength, $\times 10^3$ psi | Change Percent | Compd Flow Rate, g/10 min |
|---|---|---|---|---|---|---|---|
| 1 | None | — | 29.8 | | 17.5 | | 56 |
| 2 | Ketjen EL | Pellet | 24.9 | (−17%)[a] | 15.8 | (−10%)[a] | 36 |
| 3 | FW-200 | Fluff | 28.5 | (+16%) | 17.7 | (−2%) | 28 |
| 4 | SB-6 | Fluff | 27.4 | (+11%) | 18.9 | (+5%) | 40 |
| 5 | SB-4 | Fluff | 24.0 | (−3%) | 17.4 | (−4%) | 37 |
| 6 | Corax L | Fluff | 19.5 | (−27%) | 15.1 | (−18%) | 28 |
| 7 | Corax L-6 | Fluff | 24.9 | (−11%) | 17.2 | (−7%) | 48 |

[a]See footnote (a) of Table I.

The results show that some of the channel blacks had little or no detrimental effect on flexural and tensile strength of the PPS compounds (Runs 3–5) while others (Runs 2, 6 and 7) showed significant decreases in these properties as was shown by the oil furnace blacks in Table I. It should be noted that channel blacks are no longer made in the United States because of the high cost of natural gas and the inherent inefficiency of the manufacturing process. Thus, channel blacks are quite expensive at the present time and must be imported for United States use. The channel blacks in Runs 3–7 were obtained from Degussa of Frankfurt, Germany while the black used in Run 2 was from Ketjen Carbon NV Amsterdam, Netherlands.

EXAMPLE 2

Another series of runs using the same PPS base formulation of Example 1 was carried out to examine the effect of a variety of black carbonaceous pigments on the flexural and tensile strength of the PPS compositions. The results of these tests are presented in Table III below. The pigment level was 2% by wt. based on the total composition weight in these runs.

TABLE III

| Run No. | Black Pigment | Type | Flexural Strength, $\times 10^3$ psi | Change Percent | Tensile Strength, $\times 10^3$ psi | Change Percent | Compd Flow Rate, g/10 min |
|---|---|---|---|---|---|---|---|
| 1 | None | — | 25.5 | | 18.0 | | 65 |
| 2 | MDC[a] | Pet. Coke | 25.9 | (+2%)[f] | 17.6 | (−3%)[f] | 52 |
| 3 | D-2[a] | Bone Black | 23.2 | (−9%) | 17.4 | (−3%) | 43 |
| 4 | 3-D[b] | Bone Black | 17.3 | (−32%) | 14.5 | (−24%) | 49 |
| 5 | SC-S[c] | Bone Black | 16.3 | (−36%) | 13.7 | (−24%) | 51 |
| 6 | Carb-O-Fil | Anthracite | 23.5 | (−13%) | 16.1 | (−17%) | [g] |

TABLE III-continued

| Run No. | Black Pigment | Type | Flexural Strength, $\times 10^3$ psi | Change Percent | Tensile Strength, $\times 10^3$ psi | Change Percent | Compd Flow Rate, g/10 min |
|---|---|---|---|---|---|---|---|
| 7 | Reg[d] Carb-O-Fil 325[e] | Coal Anthracite Coal | 24.5 | (−10%) | 17.1 | (−13%) | [g] |

[a]See previous description in Section III.
[b]From Ebonex Corp. Material is 34.8% carbon by wt.
[c]From Ebonex Corp. Material is 49.9% carbon by wt.
[d]From Shamokin Filler Co., Inc. Shamokin, PA Sp. gr. 1.45–1.47, 15 micron average particle size, 80% carbon by wt.
[e]Same as (d) except 5 micron average particle size.
[f]See footnote (a) of Table I.
[g]Not measured.

In this series of runs the results show that Micronized Delayed Coke (MDC) and Cosmic Black D-2 caused only a slight drop in flexural and tensile strength of the PPS composition. However, two other bone blacks having much higher carbon contents than Cosmic Black D-2 caused a large decrease in flexural and tensile strength similar to the results obtained with oil furnace carbon blacks. It appears that suitable bone blacks for use in this invention should have a carbon content not greater than about 15 wt. %.

The relatively poor results with pulverized anthracite coal (Control Runs 6 and 7 are to be contrasted with results presented below in Example 3 wherein a pulverized bituminous coal (Austin Black 325) gave excellent results though in a different PPS composition.

EXAMPLE 3

A PPS composition having the following ingredients was utilized in a series of runs to test the effect of two other black carbonaceous pigments.

| Ingredients | Wt. % |
|---|---|
| PPS[a] | 35.00 |
| Glass Fiber | 35.00 |
| Calcium Carbonate | 28.75 or 26.75 |
| Polyethylene | 0.25 |
| Lithium Carbonate | 1.00 |
| Black Pigment | 0 or 2.00 |

[a]PPS having a flow rate of 850 ± 100 g/10 min.

The compositions were blended, extruded and prepared for testing as described in Example 1. The results are presented in Table IV below.

TABLE IV

| Run No. | Black Pigment | Type | Flexural Strength, $\times 10^3$ psi | Change Percent | Tensile Strength, $\times 10^3$ psi | Change Percent | Compd Flow Rate, g/10 min |
|---|---|---|---|---|---|---|---|
| 1 | None | — | 24.6 | | 14.3 | | 91 |
| 2 | Austin Black | Bitum. Coal | 28.4 | (+15%)[a] | 15.2 | (+6%) | 78 |
| 3 | Opal Black | Carbonized Rice Hulls | 26.5 | (+8%) | 14.1 | (+2%) | (b) |

[a]See footnote (a) Table I.
[b]Not measured.

The results in Table IV show that Austin Black 325 and Opal Black both gave excellent results in the PPS composition tested in terms of mechanical property retention. As noted earlier the results with the finely divided bituminous coal are especially surprising in view of the poor results shown with two carbonaceous pigments derived from anthracite coal as described in Example 2 above.

EXAMPLE 4

Further multiple tests were conducted to determine the effect of certain of the previously tested black carbonaceous pigments at levels of 1 or 2 wt. % in the PPS composition previously used in Example 1. The results of these tests are given in Table V.

TABLE V

| Run No. | Black Pigment | Wt. % | Flexural Strength, $\times 10^3$ psi | Change % | Tensile Strength, $\times 10^3$ psi | Change % |
|---|---|---|---|---|---|---|
| 1 | None | — | 27.3[a] | — | 18.4[a] | — |
| 2 | N-110 | 1 | 22.4[b] | −18 | 15.7[b] | −15 |
| 3 | MDC | 1 | 28.0[c] | +3 | 18.8[c] | +2 |
| 4 | Cosmic D-2 | 1 | 23.5[d] | −14 | 16.9[d] | −8 |
| 5 | SB-4 | 1 | 25.1[e] | −8 | 17.3[e] | −6 |
| 6 | N-110 | 2 | 21.0[d] | −23 | 14.8[d] | −20 |
| 7 | MDC | 2 | 25.9[e] | −5 | 17.5[e] | −5 |
| 8 | Cosmic D-2 | 2 | 23.6[c] | −14 | 16.8[c] | −9 |

[a]Average of 9 tests.
[b]Average of 5 tests.
[c]Average of 2 tests.
[d]Average of 4 tests.
[e]Average of 3 tests.

The results in Table V show that channel black (SB-4) micropulverized petroleum coke (MDC) and bone black (Cosmic Black D-2) all gave better results than the oil furnace black (N-110) in terms of maintaining flexural and tensile strength of the PPS composition. In this series of tests the micropulverized petroleum coke material was clearly better than the bone black and channel black.

EXAMPLE 5

Additional multiple tests were made with certain of the previously tested carbonaceous pigments in the PPS composition shown in Example 3 above. The results obtained in these runs are presented in Table VI below. Again, the compositions were blended, extruded and samples prepared for testing as in Example 1. Except for the control run (Run No. 1), which contained no black, each of the runs employed 2% by wt. of black pigment based on the total composition weight.

TABLE VI

| Run No. | Black Pigment | Flexural Strength, $\times 10^3$ psi | Change % | Tensile Strength, $\times 10^3$ psi | Change % |
|---|---|---|---|---|---|
| 1 | None | 24.0$^{(a)}$ | — | 14.1$^{(a)}$ | — |
| 2 | N-110 | 19.2$^{(b)}$ | −20 | 11.5$^{(b)}$ | −19 |
| 3 | MDC | 24.0$^{(c)}$ | 0 | 14.4$^{(c)}$ | +2 |
| 4 | Cosmic D-2 | 23.6$^{(b)}$ | −2 | 14.1$^{(b)}$ | 0 |
| 5 | SB-4 | 22.1$^{(b)}$ | −8 | 13.5$^{(b)}$ | −4 |

$^{(a)}$Average of 3 tests.
$^{(b)}$Average of 4 tests.
$^{(c)}$Average of 5 tests.

The results in Table VI again show the large decrease in flexural and tensile strength of the PPS composition caused by the oil furnace black (N-110) (Run 2). The micropulverized petroleum coke (MDC), bone black (Cosmic D-2) and channel black (SB-4) again were all more effective than N-110 in terms of maintaining flexural and tensile strength of the PPS composition. In this PPS composition the bone black was almost as effective as the micropulverized petroleum coke while the channel black was less effective than either of these two pigments.

I claim:

1. Pigmented poly(arylene sulfide) compositions comprising
   (a) a major proportion of an arylene sulfide resin, and
   (b) a minor but small finite effective amount ranging from about 0.25 to about 4 weight percent based on weight of total composition of a black carbonaceous pigment selected from the group consisting of finely divided bituminous coal, carbonized rice hulls, bone blacks having a carbon content less than about 15 percent by weight, and micropulverized petroleum coke wherein said amount is sufficient to provide the black pigmentation desired with little or no deleterious effect on the mechanical properties, such as tensile and flexural strengths, of the resin.

2. An article of manufacture formed from the composition of claim 1.

3. A molded article formed from the composition of claim 1.

4. A composition according to claim 1 which additionally contains inorganic filler and/or fibrous reinforcing agents.

5. A composition according to claim 4 wherein the total amount of filler and/or fibrous reinforcing agent ranges from about 10 to about 70 percent by weight based on the total composition weight.

6. Pigmented poly(phenylene sulfide) compositions comprising
   (a) a major proportion of a poly(phenylene sulfide) resin, and
   (b) a minor but small finite effective amount ranging from about 0.25 to about 4 weight percent based on weight of total composition of a black carbonaceous pigment selected from the group consisting of finely divided bituminous coal, carbonized rice hulls, bone blacks having a carbon content less than about 15 percent by weight, and micropulverized petroleum coke wherein said amount is sufficient to provide the black pigmentation desired with little or no deleterious effect on the mechanical properties, such as tensile and flexural strengths, of the resin.

7. A composition according to claim 6 wherein a the pigment has a particle size ranging from about 0.001 to about 50 microns.

8. A composition according to claim 6 which additionally contains inorganic fillers and/or fibrous reinforcing agents.

9. A composition according to claim 8 wherein the total amount of filler and/or fibrous reinforcing agent ranges from about 10 to about 70 percent by weight based on the total composition weight.

10. A composition according to claim 6 wherein said carbonaceous pigment is micropulverized petroleum coke.

11. A composition according to claim 6 which additionally contains glass fibers and the carbonaceous pigment is bone black or micropulverized petroleum coke.

12. A composition according to claim 6 which additionally contains glass fibers and calcium carbonate.

13. An article of manufacture formed from the composition of claim 10.

14. A molded article formed from the composition of claim 6.

15. A process for pigmenting poly(arylene sulfide) resins with black pigments with little or no deleterious effect on the mechanical properties, such as tensile and flexural strengths, of the resin which comprises incorporating into an arylene sulfide resin a small, finite amount of about 0.25 to about 4 weight percent based on the total weight of the composition of a black carbonaceous pigment selected from the group consisting of finely divided bituminous coal, carbonized rice hulls, bone blacks have a carbon content less than about 15 percent by weight, and micropulverized petroleum coke.

16. A process according to claim 15 wherein the arylene sulfide polymer contains inorganic fillers and/or fibers reinforcing agents in amounts ranging from about 10 to about 70 weight percent of the total weight of the composition.

17. A process according to claim 15 wherein the arylene sulfide polymer is poly(phenylene sulfide).

18. A process according to claim 15 wherein the amount of black incorporated ranges from about 0.5 to about 2 weight percent of the total composition.

19. A process according to claim 16 wherein said resin additionally contains calcium carbonate and/or glass fibers.

20. A process according to claim 19 wherein the arylene sulfide polymer is poly(phenylene sulfide).

21. A composition according to claim 6 wherein said carbonaceous pigment is finely divided bituminous coal.

22. A composition according to claim 6 wherein said carbonaceous pigment is carbonized rice hulls.

23. A composition according to claim 6 wherein said carbonaceous pigment is bone blacks having a carbon content less than about 15 percent by weight.

* * * * *